Patented June 22, 1954

2,681,923

UNITED STATES PATENT OFFICE 2,681,923

COMPOUNDS OF THE ELEMENT AMERICIUM

Larned B. Asprey, Robert A. Penneman, and Stephen E. Stephanou, Los Alamos, N. Mex., assignors to the United States of America as represented by the United States Atomic Energy Commission No Drawing. Application February 27, 1951, Serial No. 213,066

2 Claims. (Cl. 260—429)

This invention relates to compounds of the second rare earth series, and more particularly to compounds of a new valence state of the element americium.

The characterization of the elements following actinium as a second series of "rare earths" analogous to the first series which includes the fourteen elements following lanthanum, i. e., atomic numbers 58 through 71, has been verified by many workers, and acceptance of the existence of an "actinide" or second series of rare earths is now general. The series as presently understood begins with element 90, thorium, and continues with succeeding elements protoactinium, uranium, neptunium, plutonium, americium, curium, and elements of higher atomic number. However, in contrast to the behavior of the first series of rare earths wherein the highest common oxidation state is four, there has been found an oxidation state of six in the actinide series for elements of atomic number 92, 93 and 94, i. e., uranium, neptunium, and plutonium. In work prior to this invention, there had been found no evidence for the existence of an oxidation state of six for any other element of the actinide series. See, for example, Seaborg, Nucleonics, pages 16–36, November 1949.

It is therefore an object of this invention to provide a method for the preparation of the element americium in an oxidation state of six.

It is another object of this invention to provide a method for the preparation of the element americium in an oxidation state of six.

It is another object of this invention to provide a method for the preparation of compounds of the element americium wherein americium exhibits an oxidation state of six.

Further objects and advantages of the invention will be apparent from the discussion which follows.

According to the method of this invention, americium is obtained in the hexavalent oxidation state by oxidation of lower valent americium, i. e., americium of valence three or five, tetravalent americium being not known to exist in solution. One method is the treatment of americium of valence three or five in moderately dilute acid solution with solid ammonium peroxydisulfate or with solid argentic oxide. The above oxidations are found to be most successful at an acid concentration of about 0.1 to about 1 molar. In 3 molar acid, no oxidation is found to occur. Americium (V) may also be oxidized in dilute acid solution with ceric ion or permanganate ion.

It has also been found that americium of valence three or five may be converted to the hexavalent oxidation state by anodic oxidation in concentrated acid, that is, strong mineral acid of at least 6 molar concentration. For example, a yield of 80 per cent of americium (VI) has been obtained in 6 molar perchloric acid by electrolysis. At lower acidities, the oxidation is unsuccessful.

It has been further found that when a dilute acid solution of americium (V) is raised to a hydrogen ion concentration of 3 molar or greater, the americium (V) disappears rapidly and a corresponding growth of americium (VI) and americium (III) is noted. This process is one of disproportionation, or of self oxidation-reduction.

Evidence obtained for the production of americium (VI) by the above methods includes preparation and identification of sodium americyl acetate, in which compound the americium is in the hexavalent state, and successful solvent extraction of americium (VI), e. g., ether extraction of americyl nitrate, in manners analogous to those well known for the hexavalent oxidation state of uranium, neptunium and plutonium. Further evidence is obtained by spectrophotometric means: the spectrum of americium (VI) is characterized by a strong absorption band having a sharp peak at 992 millimicrons, a minor peak at 666 millimicrons and general ultraviolet absorption. The characteristic peaks for americium (III) at 504 and 811 millimicrons and the peaks for americium (V) at 514 and 715 millimicrons are absent. (See Cunningham, Transuranic Elements, National Nuclear Energy Series, IV, vol. 14B, part 2, McGraw-Hill, New York, 1949, paper 19.2, and Werner and Perlman, ibid. paper 22.5.) The americium (VI) peak at 992 millimicrons is useful in the determination of americium (VI).

Sodium americyl acetate has been prepared by adding sodium acetate to a 0.02 molar solution of americium (VI) in 0.3 molar perchloric acid. The lemon-yellow precipitate which forms is centrifuged and dried with acetone. The precipitate, on comparison with the analogous compounds of uranium, neptunium and plutonium, is found to exhibit the expected analogous properties such as tetrahedral crystal habit and comparable refractive index (Table I).

TABLE I

*Refractive indices*

| Compound | Index (vs. D line of Sodium) |
|---|---|
| Sodium Uranyl Acetate | 1.5015±0.0005 |
| Sodium Neptynyl Acetate | 1.5105±0.0005 |
| Sodium Plutonyl Acetate | 1.518±0.001 |
| Sodium Americyl Acetate | 1.528±0.002 |

A solution of americium (VI) gives no precipitate with hydrofluoric acid. This behavior serves as a further differentiation from lower valent americium, for example, americium (III), which gives an insoluble fluoride when treated with hydrofluoric acid.

From considerations of the above experimental results and the known chemistry of uranium and plutonium, it is seen that the general chemical behavior of americium (VI) is similar to that of uranium (VI) and plutonium (VI). The absorption spectrum of americium (VI) resembles that of plutonium (VI), although it is unlike the spectrum of uranium (VI) or neptunium (VI). Both americium (VI) and plutonium (VI) have an extremely sharp absorption band in the near infra-red (Moore and Krause, Spectrophotometry of Plutonium VI in Perchlorate Solutions, Mon-C-204, January, 1948).

The oxidation of americium (V) to americium (VI) may in general be effected by oxidizing agents of a potential of about 1.6 volts, while for the oxidation of trivalent americium to the hexavalent state an agent of potential in excess of about 1.9 volts is required. Ceric ion is the preferred agent for the americium (V)—(VI) oxidation, while peroxydisulfate and argentic oxide are preferred for the americium (III)—(VI) conversion.

Inasmuch as many other embodiments of this invention will be apparent to those skilled in the art, no limitations are intended beyond those of the appended claims.

What is claimed is:

1. The process which comprises treating americium of oxidation state less than six in a solution of perchloric acid of concentration of about 0.3 molar with an excess of a soluble peroxydisulfate, whereby americium is obtained in an oxidation state of six, adding sodium acetate to the solution whereby insoluble sodium americyl acetate is formed, and recovering the precipitated sodium americyl acetate.

2. The process of claim 1 wherein the soluble peroxydisulfate is ammonium peroxydisulfate.

References Cited in the file of this patent

Seaborg et al., The New Element Americium, AECD 2185, pp. 6 and 7, declassified July 30, 1948.

Cunningham, The Isolation and Chemistry of Americium, AECD-1879, 5 pp. Feb. 9, 1948. U. S. Atomic Energy Commission.

Eyring et al., Heats of Reaction of Some Oxides of Americium and Praesodymium with Nitric Acid and an Estimate of the Potentials of the Am. (III) Am. (IV) and Pr (III) and Pr (IV) Couples, AECD-2897, page 17, July 7, 1950. U. S. Atomic Energy Comm.

Asprey et al., The Autoreduction of Am. (VI) and Am. (V) in Dilute Acid, AECU-924, Nov. 10 1950, US Atomic Energy Comm.

Chamot et al., Handbook of Chem. Microscopy, 2nd ed. vol. II, p. 51, (1940). John Wiley & Sons, New York.